(12) United States Patent
Ouyang

(10) Patent No.: US 8,014,086 B2
(45) Date of Patent: Sep. 6, 2011

(54) HOUSING ASSEMBLY

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 95 days.

(21) Appl. No.: 12/538,285

(22) Filed: Aug. 10, 2009

(65) Prior Publication Data

US 2010/0277819 A1 Nov. 4, 2010

(30) Foreign Application Priority Data

Apr. 30, 2009 (CN) .............................. 200910302059

(51) Int. Cl.
*G02B 7/02* (2006.01)

(52) U.S. Cl. .......................... 359/819; 359/821; 359/827
(58) Field of Classification Search ................... 359/819
See application file for complete search history.

(56) References Cited

U.S. PATENT DOCUMENTS

| 4,988,986 | A | * | 1/1991 | Martin | 340/815.73 |
| 7,665,913 | B2 | * | 2/2010 | Kim | 396/448 |
| 7,780,288 | B2 | * | 8/2010 | Silverbrook et al. | 347/108 |
| 2006/0067657 | A1 | * | 3/2006 | Rydelek et al. | 396/6 |

* cited by examiner

*Primary Examiner* — Scott J Sugarman
*Assistant Examiner* — Vipin Patel
(74) *Attorney, Agent, or Firm* — Altis Law Group, Inc.

(57) ABSTRACT

A housing assembly is provided including a housing, a lens panel received in the housing, and a shell. The shell includes latching end portions and secured with the housing by a latching of the latching end portions with the housing. The lens panel is secured between the housing and the shell and partially exposed through the shell.

17 Claims, 3 Drawing Sheets

HOUSING ASSEMBLY

BACKGROUND

1. Technical Field

The present disclosure relates to a housing assembly incorporating a lens panel.

2. Description of Related Art

A lens panel for supporting a plurality of lenses is commonly applied in camera modules for portable electronic devices. Housing assemblies including housings are commonly used to assemble the lens panels therein. The lens panel is usually adhered to the periphery of the housing. However, the adherence might be deteriorated after a period of time, thus leading to a detachment of lens panel away from the housing. Moreover, the overall size of the housing assembly increases because of the adherence of the lens panel.

Therefore, there is room for improvement within the art.

BRIEF DESCRIPTION OF THE DRAWING

Many aspects of the new housing assembly can be better understood with reference to the following drawings. The components in the drawings are not necessarily drawn to scale, the emphasis instead being placed upon clearly illustrating the principles of the new housing assembly. Moreover, in the drawings, like reference numerals designate corresponding parts throughout the several views.

DETAILED DESCRIPTION

Figure 1:
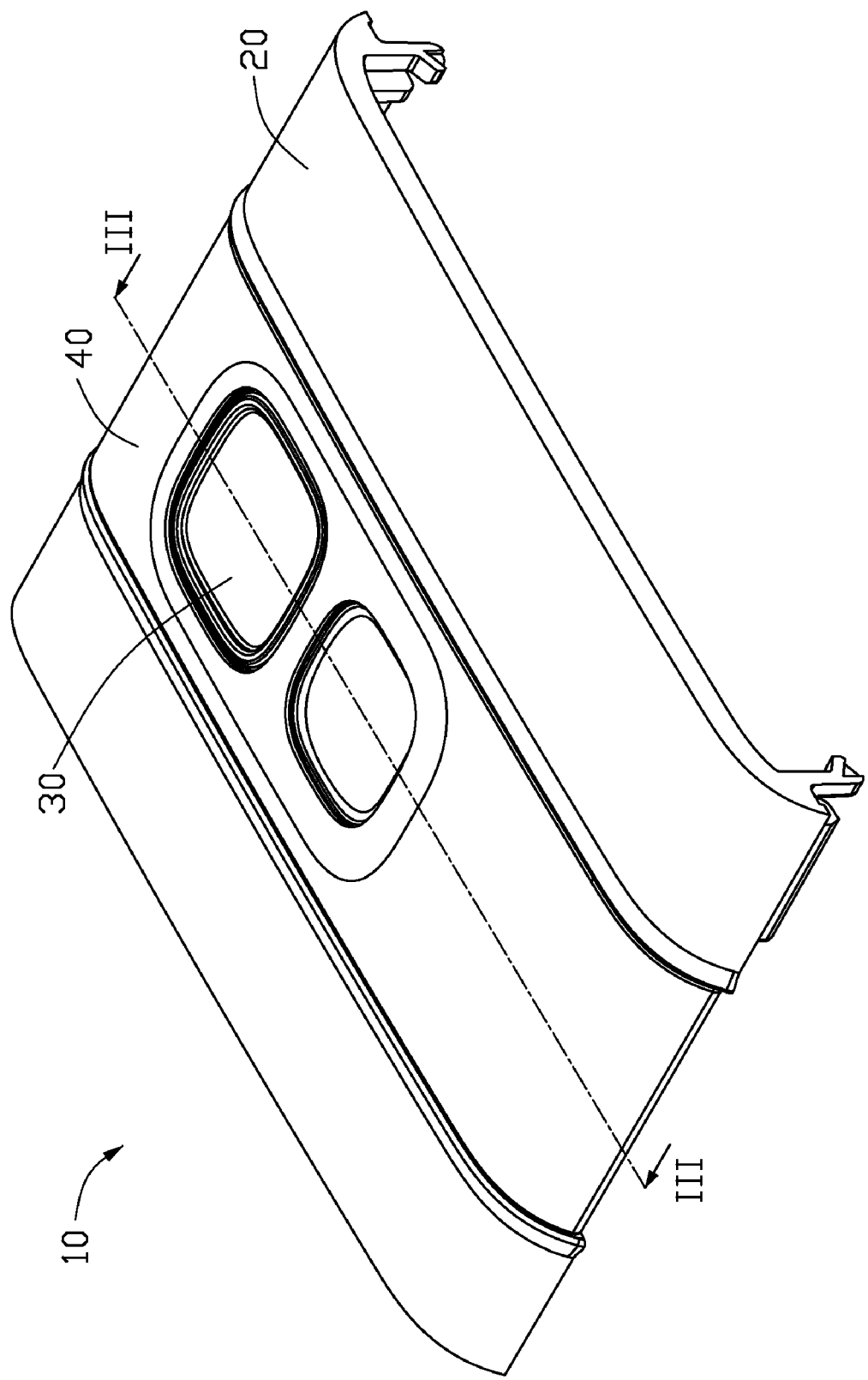
FIG. 1 is an isometric assembled view of a housing assembly according to an exemplary embodiment.
Figure 2:
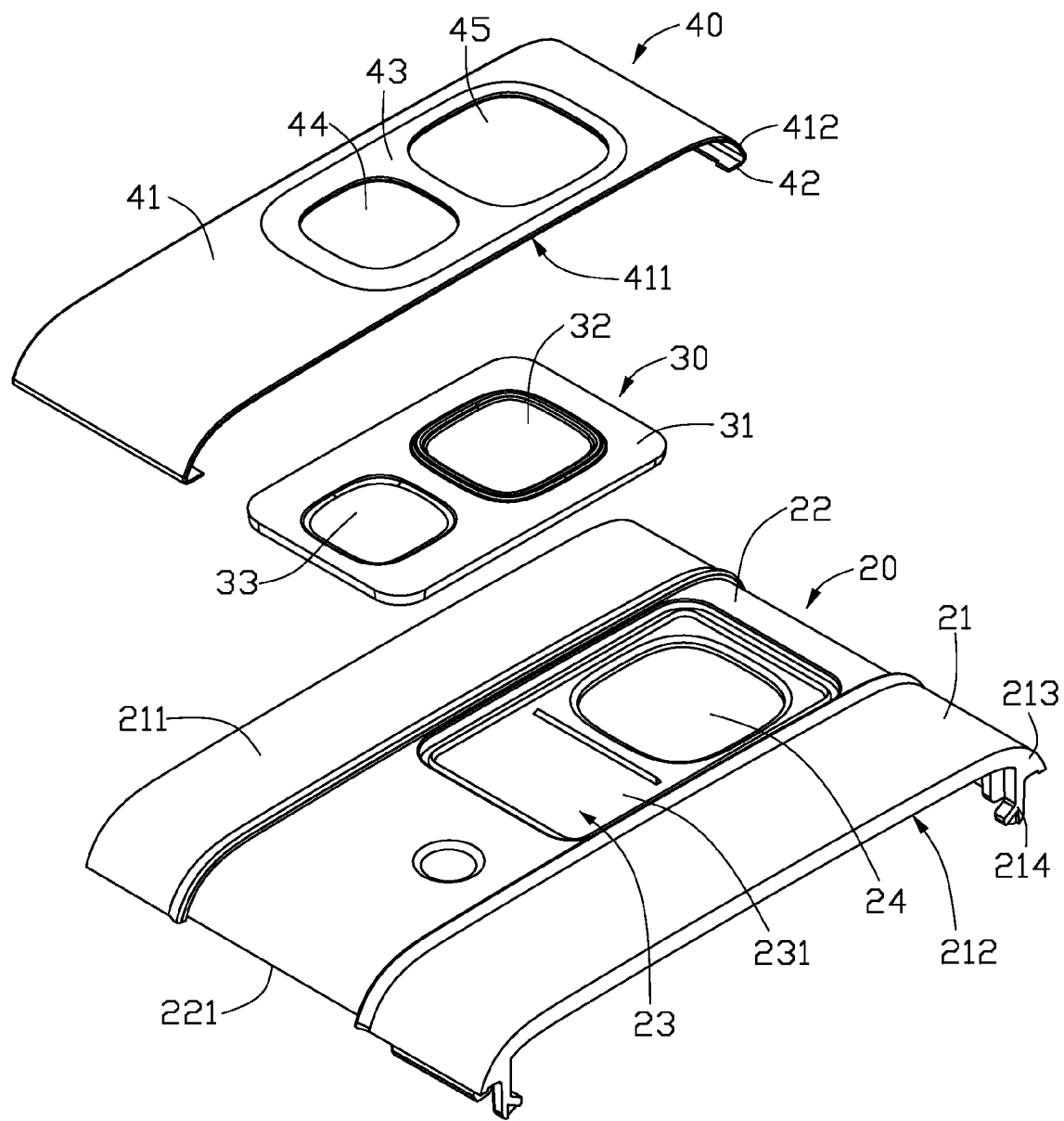
FIG. 2 is an exploded view of the housing assembly shown in FIG. 1.
Figure 3:
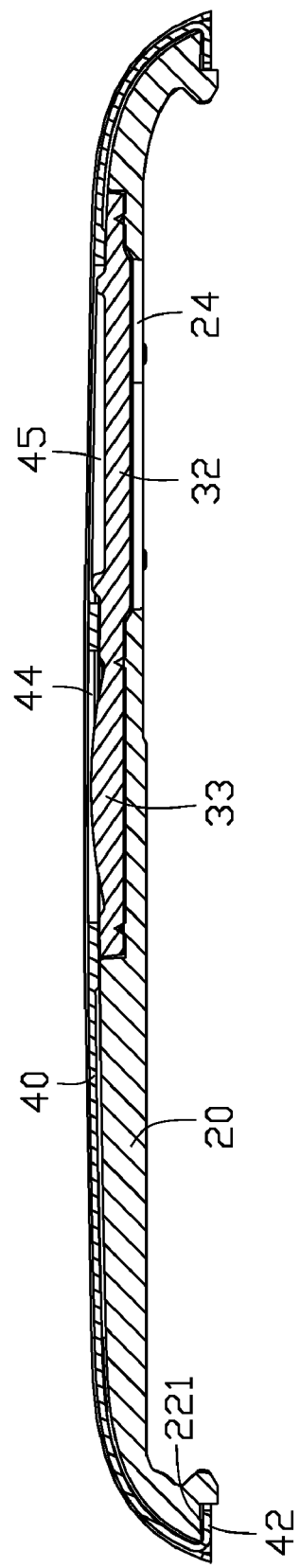
FIG. 3 is a cross-sectional view of the housing assembly shown in FIG. 1, taken alone line III-III.

FIGS. 1 through 3 show an exemplary housing assembly 10 of portable electronic devices including a housing 20, a lens panel 30, and a shell 40 attached to the housing 20.

Referring to FIG. 2 and FIG. 3, the housing 20 includes a housing body 21, a mounting groove 22, and an accommodating cavity 23. The housing body 21 includes an upper surface 211, a bottom surface 212, two curved portions 213 and two locking members 214. The curved portions 213 are on opposite sides, respectively, of the housing body 21, and the locking members 214 are, respectively, also on opposite sides of the housing body 21 perpendicular to the curved portions 213. The curved portions 212 respectively extend downwardly from opposite distal ends of the bottom surface 212. The locking members 214 extend substantially vertically and downwardly from the bottom surface 212, abutting the curved portions, respectively. The locking members 214 are used to lock the housing assembly 10 with the portable electronic device.

The mounting groove 22 is defined in the housing body 21 and exposed through the upper surface 211. Two opposite latching end sections 221 are defined in the curved portions 212 and located at the bottom of the mounting groove 22. The accommodating cavity 23 is recessed into the bottom of the mounting groove 22. The accommodating cavity 23 is enclosed by a bottom wall 231. The bottom wall 231 defines an aperture 24 through the housing body 21 for passing light.

The lens panel 30 includes a frame 31 and a view lens 32 supported by the frame 31. The frame 31 also supports a lamp lens 33 (lamp wiring not shown) attached adjacent to the view lens 32. The lens panel 30 can be secured, for example, hot-melted into the accommodating cavity 23, and the view lens 32 aligns above the aperture 24. The aperture 24 is sealed by the lens panel 30, so that containments such as dust cannot enter through the aperture 24 into the inside of the portable electronic device.

The shell 40 includes a shell body 41, two elastic latching end portions 42 and an engaging portion 43. The shell body 41 includes a planar surface 411 and two opposite end portions 412. The two end portions 412 are bent for engaging with the two curved portions 213 of the housing 20 correspondingly. The latching end portions 42 extend from the end portions 412 in parallel with the plannar surface 411, towards with each other. The engaging portion 43 is used to engage into the mounting groove 22 and defines a view lens hole 45 and a lamp lens hole 44 corresponding to the view lens 32 and the lamp lens 33.

Referring again to FIGS. 1 and 3, during assembly, the lens panel 30 is secured into the accommodating cavity 23. The shell 40 can be adhered within the mounting groove 22, and the latching end portions 42 elastically latches to the latching end sections 221. Accordingly, the lens panel 30 is securely sandwiched between the shell 40 and the housing 20. The view lens 32 and the lamp lens 33 are received in and exposed through the view lens hole 45 and the lamp lens hole 44. Meanwhile, the view lens 32 aligns above the aperture 24. The lamp lens 33 near the view lens 32 is blocked by the bottom wall 231 since light need not pass through the lamp lens 33.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing assembly, comprising:
   a housing including a bottom wall, and defining a mounting groove enclosed by the bottom wall, the housing further defining an accommodating cavity through the bottom wall;
   a lens panel received in the housing, the lens panel integrally comprising a view lens and a lamp lens; and
   a shell comprising latching end portions, the shell secured with the housing by a latching of the latching end portions with the housing, the lens panel secured between the housing and the shell, the view lens and the lamp lens secured in the same accommodating cavity, the lamp lens blocked by the bottom wall.

2. The housing assembly as claimed in claim 1, wherein the lens panel comprises a frame, and the view lens and the lamp lens is secured and supported by the frame, the frame secured in the accommodating cavity.

3. The housing assembly as claimed in claim 2, wherein the shell defines a view lens hole corresponding to the view lens, the lens panel defines an aperture, the view lens hole, the view lens, and aperture align with each other.

4. The housing assembly as claimed in claim 3, wherein the frame seals the aperture.

5. The housing assembly as claimed in claim 1, wherein the housing further comprises latching end sections, the accommodating cavity is located below and communicates with the mounting groove, the shell comprises latching end sections, and the shell is secured in the mounting groove by a latching of the latching end portions with the latching end sections.

6. The housing assembly as claimed in claim 5, wherein the housing further comprises a housing body and two opposite curved portions, the mounting groove is defined in the housing body, the latching end sections are located at distal ends of the mounting groove.

7. The housing assembly as claimed in claim 6, wherein the housing further comprises locking members, the housing body includes a bottom surface, the locking members extend from the bottom surface abutting the curved portions.

8. The housing assembly as claimed in claim 5, wherein the shell comprises a shell body and two opposite end portions connecting the shell body, the latching end sections extend from the end portions in parallel with the shell body.

9. A housing assembly, comprising:
- a housing including an upper surface, defining a mounting groove in the upper surface, and further defining an accommodating cavity smaller than and positioned below the mounting groove;
- a lens panel integrating with a view lens and a lamp lens; and
- a shell including a planar surface and being laterally secured with the housing and in the mounting groove with the planar surface being received and blocked by the upper surface of the housing, the lens panel secured by two reverse abutting of the shell and the housing and sandwiched between the housing and the shell, and wholly enclosed by the housing, view lens and the lamp lens secured in the same accommodating cavity.

10. The housing assembly as claimed in claim 9, wherein, the lens panel is received in the accommodating cavity.

11. The housing assembly as claimed in claim 10, wherein the lens panel comprises a frame, and the view lens and the lamp lens are secured and supported by the frame, the frame secured in the accommodating cavity.

12. The housing assembly as claimed in claim 11, wherein the shell defines a view lens hole corresponding to the view lens, the lens panel defines an aperture, the view lens hole, the view lens, and aperture align with each other.

13. The housing assembly as claimed in claim 12, wherein the frame seal the aperture.

14. The housing assembly as claimed in claim 10, wherein the housing further comprises latching end sections, the accommodating cavity is located below and communicates with the mounting groove, the shell comprises latching end sections, and the shell is secured in the mounting groove by a latching of the latching end portions with the latching end sections.

15. The housing assembly as claimed in claim 14, wherein the housing further comprises a housing body and two opposite curved portions, the mounting groove is defined in the housing body, the latching end sections are located at distal ends of the mounting groove.

16. The housing assembly as claimed in claim 15, wherein the housing further comprises locking members, the housing body includes a bottom surface, the locking members extend from the bottom surface abutting the curved portions.

17. The housing assembly as claimed in claim 14, wherein the shell comprises a shell body and two opposite end portions connecting the shell body, the latching end sections extend from the end portions in parallel with the shell body.

* * * * *